United States Patent

Ehrenberg

[15] 3,679,245
[45] July 25, 1972

[54] ARTICLE OF MANUFACTURE
[72] Inventor: Hermann Ehrenberg, Michelstadt, Odw, Germany
[73] Assignee: Fouquet-Werk Frauz & Planck, Neckar, Germany
[22] Filed: April 27, 1971
[21] Appl. No.: 137,353

Related U.S. Application Data

[63] Continuation-in-part of Ser. No. 811,145, March 27, 1969, Pat. No. 3,578,364.

[30] Foreign Application Priority Data

Feb. 22, 1968  Germany ..................... P 16 75 138.5
Dec. 30, 1968  Germany ..................... P 18 17 398.3
April 27, 1970 Germany ..................... P 20 20 469.7

[52] U.S. Cl. .............................................. 287/52, 279/2
[51] Int. Cl. ............................................... F16d 1/06
[58] Field of Search ............. 287/52, 52.04, 52.06; 279/2

[56] References Cited

UNITED STATES PATENTS 2,460,510  2/1949  Laesser ......................... 287/52.06
2,801,858  8/1957  Spieth ............................... 279/2
2,989,327  6/1961  Hermanus ..................... 287/52 R
3,112,116  11/1963 Seitz ................................. 279/2

*Primary Examiner*—Andrew V. Kundrat
*Attorney*—Michael S. Striker

[57] ABSTRACT

A connecting element for connecting two coaxial elements which define with one another an annular clearance in which the connecting element is located in frictional engagement with both the coaxial elements. The connecting element is in form of an annular member of elastically yieldable material provided with a transverse annular portion with an outer and an inner annular flange portion projecting from the outer and inner margin thereof in one and the same axial direction. An axially projecting bead is provided on a side of the transverse annular portion which is opposite the flange portions and has a radial thickness corresponding substantially to three times the radial thickness of either one of the flange portions. Intermediate the flange portions at the axial side at which the latter are located, the transverse annular portion is provided with an annular groove whose steps corresponds at least approximately to the axial thickness of the annular transverse portion.

6 Claims, 2 Drawing Figures

PATENTED JUL 25 1972 3,679,245
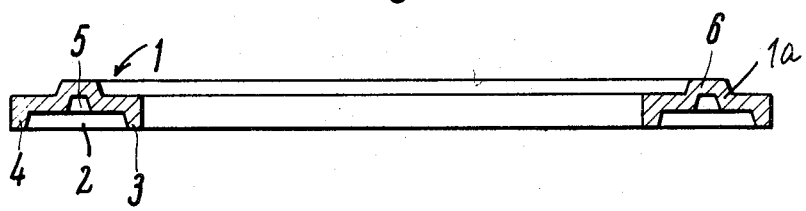
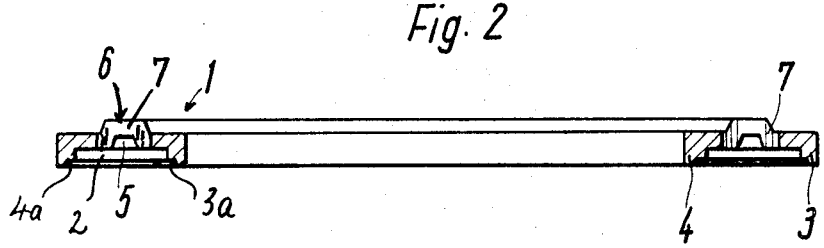
Inventor:
HERMANN ERRETH

ARTICLE OF MANUFACTURE

CROSS-REFERENCE TO RELATED APPLICATION

The present application is a continuation-in-part of my copending application Ser. No. 811,145, filed on Mar. 27, 1969 under the title "Connecting Arrangement", now U. S. Pat. No. 3,578,364.

BACKGROUND OF THE INVENTION

The present invention relates to a novel article of manufacture in general, and more particularly to a novel connecting element for use in a connecting arrangement which connects two members one of which surrounds the other with annular clearance.

In my aforementioned copending application I have disclosed a connecting arrangement in which a substantially cylindrical inner member is surrounded with clearance by an annular outer member. In this clearance there is located connecting means in form of one or several axially consecutive annular members which in axial section are of substantially Z-shaped or substantially Y-shaped configuration and which, when subjected to axial stress, are spread radially into engagement with the opposite surfaces of the inner and outer member, to thereby frictionally engage and connect these members against movement relative to one another.

With that disclosed construction of my prior copending application I have provided a connecting arrangement in which a uniform and simultaneous frictional engagement of any and all annular members utilized in the connecting arrangement, is obtained when a stressing arrangement provided for this purpose imparts axial stress to such annular elements, that is stress which acts axially of the annular clearance in which these elements are accommodated. Such stress results in radial inward deflection of the inner annular wall portions of these elements, that is wall portions which extend in one axial direction from an annular transverse wall portion of the respective elements, and at the same time such stress also results in radial outward deflection of the outer annular wall portions, that is again such wall portions which extend in the same direction from the outer marginal circumference of the annular transverse portion. Depending upon the extent to which axial force or stress is imparted to the single or several such annular elements, the contact between the inner and outer wall portions and the associated outer and inner surfaces of the inner and outer members which are to be connected, will be over a part or over the entire axial length of the inner and outer wall portions. No axial displacement or other axial shifting of the individual annular elements with reference to one another, or of the annular elements with reference to the inner and outer members to be connected, will occur when axial stress is applied.

As pointed out before, the annular elements utilized in accordance with my copending prior application are essentially of a cross-section which resembles either a stylized Y or a stylized Z. Insofar as the cross-section resembles a stylized Y, the inner and outer wall portions correspond to the arms of the Y, whereas at the opposite axial side of the transverse annular portion from which these arms project, there is located centrally an additional arm or bead which constitutes the leg of the Y. Of course, the inner and outer wall portions as well as the bead or leg are annular. The inner and outer wall portions of the same axial length and the wall thickness of all of the wall portions, that is the inner and outer wall portions as well as the bead, is identical with the thickness increasing in direction towards the junction of the respective wall portion or bead with the annular transverse portion of the respective annular element.

I have found, however, that I can substantially increase the connecting effectiveness of such annular elements of substantially Y-shaped cross-section if, in accordance with the present invention, I change certain configurations of these elements.

SUMMARY OF THE INVENTION

It is, accordingly, an object of the present invention to provide such an improved annular elements as an article of manufacture.

More particularly it is an object of the present invention to provide such an improved annular element which, when utilized as the single or part of a connecting arrangement located in an annular gap between an inner and an outer concentric member, will provide for a firmer and more reliable connection between these members —in a sense preventing their relative displacement— than is possible with the arrangement disclosed in my copending application.

In pursuance of the above objects, and of others which will become apparent hereafter, one feature of my invention recites in a novel article of manufacture constituting a connecting element which is adapted to be accommodated in an annular clearance between two coaxial elements for frictionally engaging and connecting the same. My novel connecting element comprises an annular member of elastically yieldable material having a transverse annular portion of predetermined axial thickness and being provided with oppositely directed axial faces. An outer and an inner annular flange portion both project from one of these faces axially of the annular portion at an outer and an inner margin thereof, respectively. An axially projecting bead is provided on the other of these axial faces centrally thereof and has a radial thickness corresponding to at least substantially triple the thickness of the respective flange portion. Finally, I also provide an annular groove provided in the aforementioned one axial face centrally of the same and opposite the bead, such annular groove having a depth which corresponds at least substantially to the predetermined axial thickness.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial section illustrating one embodiment of the invention; and

FIG. 2 is a section similar to FIG. 1 but illustrating a somewhat modified embodiment of the invention.

DESCRIPTION OF THE PREFERRED EMBODIMENTS

Before entering into a detailed description of FIGS. 1 and 2 I emphasize that aside from the details specifically disclosed herein and constituting an improvement over the disclosure of my copending prior application, the article according to the present invention resembles and is intended for the same purpose as the analogous articles disclosed in my copending application. In particular reference may be had to my copending application for details of the manner in which one or more of the novel articles may be located in an annular clearance between an inner and a concentric outer member, and in which way stressing means may be utilized to effect axial stressing of the one or more novel articles and to thereby effect connection between the inner and outer concentric members by causing portions of my novel article or articles to be forced into tight frictional engagement with these inner and outer concentric members.

Keeping this in mind, and referring firstly to FIG. 1 of the present application, it is pointed out that the novel article disclosed therein is in form of an annular element 1 having an annular transverse portion 1a from one axial side of which there project at the inner and outer circumferential margin of the portion 1a, the annular flange portions or leg portions 3 and 4. These define between themselves an annular recess 2. At the opposite axial side of the portion 1a there is provided an annular bead or leg 6 which projects in opposite axial direction from the legs 3 and 4.

At the bottom of the recess 2, that is in the axial side from which the legs 3 and 4 project and located midway between them so as to be opposite the bead 6, is provided an annular groove 5 having a thickness which corresponds at least substantially to the axial thickness of the portion 1a.

The radial thickness of the bead or leg 6 corresponds at least approximately to triple the radial thickness of the legs 3 or 4, respectively. When I mention radial thickness of the leg 6 I refer to the total cross-section of the leg 6, not counting such part of this cross-section as may be hollow due to the groove 5 possibly projecting to some extent into the bead 6.

The axial length of the bead or leg 6 corresponds approximately to the axial thickness of the portion 1a and the thickness of the legs 3 and 4 decreases in the direction axially away from the portion 1a.

The embodiment of FIG. 2 resembles very much the embodiment of FIG. 1. In FIG. 2 there is provided a plurality (two shown) of apertures or holes 7 which are circumferentially spaced and penetrate both the leg 6 and the portion 1a. It is emphasized that these apertures 7 may and normally will also be present in the embodiment of FIG. 1. In FIG. 2 the legs 3 and 4 are provided in their axial edge faces which are remote from the portion 1a, with radially inward bevels 3a and 4a, respectively, that is these bevels are inclined inwardly of the recess 2 and axially towards the groove 5. In all other respects the embodiment of FIG. 2 is the same as that of FIG. 1.

By resorting to the present invention my novel article, which may be made of a springy material such as steel, has lesser wall thicknesses and, consequently, can be more evenly deflected, having a more even and more pronounced yieldability or elasticity. In consequence, when axial stress is exerted with a means such as that disclosed in my aforementioned copending application, the leg 3 will move more readily and more evenly inwardly —pivoting about the juncture of the element 1 with the inwardly directed side of the bead or leg 6, and the leg 4 will be similarly displaced but in this case in radially outward direction. The legs 3 and 4 will thus respectively engage the outer surface of an inner member surrounded by the element 1 and the inner surface of an outer member which in turn surrounds the member 1 and the inner member, resulting in tight frictional engagement of the legs 3 and 4 with the inner and outer members, respectively, so that the latter are prevented from axial and rotational displacement relative to one another in the manner fully disclosed in my copending application. This pivoting is greatly facilitated by the provision of the groove 5 because the reduction in the wall thickness of the portion 1a —and in part of the bead or leg 6 if the groove 5 is permitted to extend into the same—facilitates such pivoting and deflection and provides the desirable improvement of obtaining more even deflection and frictional engagement of the legs 3 and 4 with the respectively associated inner and outer concentric members.

It will be understood that each of the elements described above, or two or more together, may also find a useful application in other types of applications differing from the types described above.

While the invention has been illustrated and described as embodied in a connecting element for connecting two coaxial elements which define with one another an annular clearance, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. As a novel article of manufacture, a connecting element adapted to be accommodated in an annular clearance between two coaxial elements for frictionally engaging and connecting the same, said connecting element comprising an annular member of elastically yieldable material having a transverse annular wall portion of predetermined axial thickness in direction along a central longitudinal axis extending through said annular member and provided with oppositely directed radial faces, an outer and an inner annular flange portion both projecting from one of said faces axially of said annular wall portion at a radially outer and an inner peripheral margin thereof, respectively, and an axially projecting bead provided on the other of said radial faces centrally thereof and having a radial thickness corresponding to at least substantially triple the thickness of the respective flange portions; and an annular groove provided in said one radial face centrally of the same and opposite said bead, said annular groove having a depth corresponding at least substantially to said predetermined axial thickness.

2. An article of manufacture as defined in claim 1, wherein said material is steel.

3. An article of manufacture as defined in claim 1, wherein said flange portions are of substantially identical axial length.

4. An article of manufacture as defined in claim 1, wherein said flange portions each have a free edge face axially spaced from said transverse annular wall portion; and wherein the radial thickness of said flange portions tapers in direction from said transverse annular wall portion toward the respective free edge face.

5. An article of manufacture as defined in claim 1, wherein said flange portions each have a free edge face axially spaced from said transverse annular wall portion; and wherein said free edge faces are each bevelled in radially inward direction of said annular member.

6. An article of manufacture as defined in claim 1, said transverse annular wall portion being provided with a plurality of circumferentially spaced holes.

* * * * *